(12) United States Patent
Schuberth et al.

(10) Patent No.: US 10,328,937 B2
(45) Date of Patent: Jun. 25, 2019

(54) METHOD FOR OPERATING A MOTOR VEHICLE USING A LONGITUDINAL DRIVER ASSISTANCE SYSTEM

(71) Applicant: AUDI AG, Ingolstadt (DE)

(72) Inventors: Stefan Schuberth, Gaimersheim (DE); Ralf Held, Eichstätt (DE); Jörg Hösterei, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 63 days.

(21) Appl. No.: 15/543,961

(22) PCT Filed: Dec. 19, 2015

(86) PCT No.: PCT/EP2015/002571
§ 371 (c)(1),
(2) Date: Jul. 14, 2017

(87) PCT Pub. No.: WO2016/112946
PCT Pub. Date: Jul. 21, 2016

(65) Prior Publication Data
US 2018/0015921 A1    Jan. 18, 2018

(30) Foreign Application Priority Data
Jan. 17, 2015  (DE) .......................... 10 2015 000 527

(51) Int. Cl.
*B60W 30/00*    (2006.01)
*B60W 30/16*    (2012.01)
(Continued)

(52) U.S. Cl.
CPC ......... *B60W 30/16* (2013.01); *B60K 31/0008* (2013.01); *B60T 7/22* (2013.01);
(Continued)

(58) Field of Classification Search
CPC .................................................. B60W 30/16
See application file for complete search history.

(56) References Cited

U.S. PATENT DOCUMENTS 6,820,709 B1  11/2004  Zimmermann et al.
6,853,903 B2   2/2005  Michi et al.
(Continued)

FOREIGN PATENT DOCUMENTS

CN    202641690 U    1/2013
CN    103373355 A   10/2013
(Continued)

OTHER PUBLICATIONS

International Search Report and Written Opinion of the International Searching Authority directed to related International Patent Application No. PCT/EP2015/002571, dated Mar. 30, 2016, with attached English-language translation; 20 pages.
(Continued)

*Primary Examiner* — Truc M Do
(74) *Attorney, Agent, or Firm* — Sterne, Kessler, Goldstein & Fox, P.L.L.C.

(57) ABSTRACT

The invention relates to the operation of a motor vehicle having a long-distance driver assistance system comprising at least one sensor which detects the area in front of a vehicle, and a control device which is designed to detect another motor vehicle traveling ahead, in order to drive the motor vehicle relative to the other vehicle traveling ahead when the driver assistance system is activated and operationally ready, wherein the activated driver assistance system can be deactivated from a control or regulating mode by driver activity, wherein upon deactivation, the system may enter into a system standby mode continuously detecting the area in front of the motor vehicle, and can reactivate autonomously once another motor vehicle traveling ahead is detected and a drag deceleration is required to reduce a (Continued)

Figure 1:
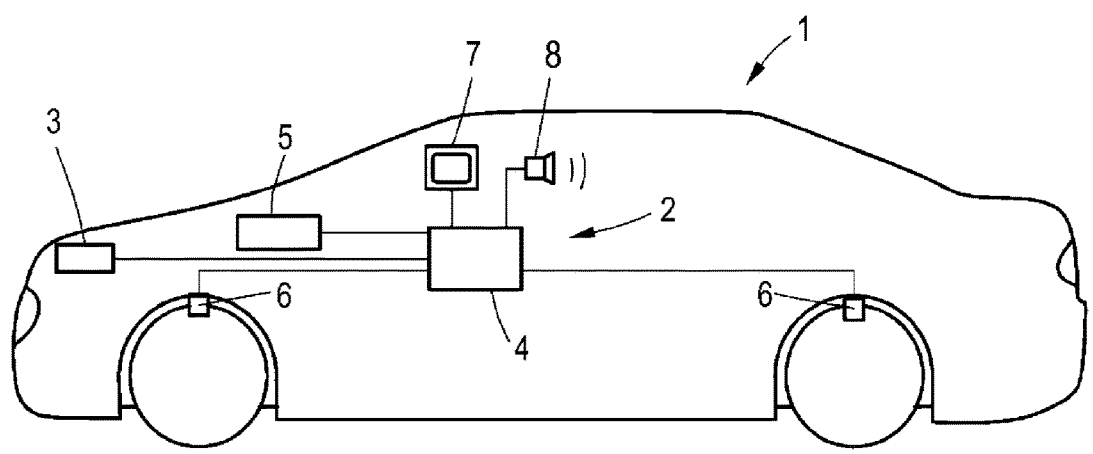

velocity difference between the operated motor vehicle and the other vehicle traveling ahead.

6 Claims, 2 Drawing Sheets

(51) Int. Cl.
 *B60W 50/14* (2012.01)
 *B60K 31/00* (2006.01)
 *B60T 7/22* (2006.01)
 *B60W 10/04* (2006.01)
 *B60W 10/18* (2012.01)
(52) U.S. Cl.
 CPC ............. *B60W 50/14* (2013.01); *B60W 10/04* (2013.01); *B60W 10/18* (2013.01); *B60W 2540/04* (2013.01); *B60W 2540/10* (2013.01); *B60W 2550/10* (2013.01); *B60W 2550/308* (2013.01); *B60W 2710/0605* (2013.01); *B60W 2710/18* (2013.01); *B60W 2750/308* (2013.01); *B60Y 2300/16* (2013.01); *B60Y 2400/3042* (2013.01)

(56) References Cited

U.S. PATENT DOCUMENTS

| 9,862,272 | B2 | 1/2018 | Schuberth et al. | |
|---|---|---|---|---|
| 9,994,221 | B2* | 6/2018 | McNew | B60W 30/165 |
| 10,146,357 | B2* | 12/2018 | Bendewald | G06F 3/0416 |
| 2002/0133285 | A1* | 9/2002 | Hirasago | B60K 31/0008 |
| | | | | 701/96 |
| 2003/0135318 | A1* | 7/2003 | Tellis | B60K 31/0008 |
| | | | | 701/96 |
| 2007/0005218 | A1* | 1/2007 | Ueyama | B60W 30/16 |
| | | | | 701/96 |
| 2007/0272464 | A1* | 11/2007 | Takae | B60W 10/06 |
| | | | | 180/169 |
| 2010/0179741 | A1* | 7/2010 | Pelosse | B60W 30/143 |
| | | | | 701/96 |
| 2010/0198478 | A1* | 8/2010 | Shin | B60W 10/06 |
| | | | | 701/96 |
| 2010/0204897 | A1* | 8/2010 | Labuhn | B60W 30/16 |
| | | | | 701/93 |
| 2012/0083964 | A1* | 4/2012 | Montemerlo | G01S 17/936 |
| | | | | 701/26 |
| 2012/0265418 | A1* | 10/2012 | Foerster | B60T 7/22 |
| | | | | 701/70 |
| 2013/0231829 | A1* | 9/2013 | Gerdt | G05D 1/0061 |
| | | | | 701/41 |
| 2013/0289844 | A1 | 10/2013 | Park | |
| 2015/0006028 | A1* | 1/2015 | Strauss | B62D 1/28 |
| | | | | 701/36 |
| 2016/0231855 | A1* | 8/2016 | Bendewald | B60W 50/14 |

FOREIGN PATENT DOCUMENTS

| CN | 103702883 A | 4/2014 |
|---|---|---|
| DE | 198 33 645 A1 | 1/2000 |
| DE | 10 2007 036 417 A1 | 2/2009 |
| DE | 10 2011 085 585 A1 | 5/2013 |
| EP | 1 356 978 A1 | 10/2003 |
| EP | 1 437 254 A1 | 7/2004 |
| EP | 1 726 501 A1 | 11/2006 |
| WO | 99/07571 A1 | 2/1999 |
| WO | 01/40011 A1 | 6/2001 |

OTHER PUBLICATIONS

International Preliminary Report on Patentability directed to related International Patent Application No. PCT/EP2015/002571, dated Apr. 13, 2017, with attached English-language translation; 13 pages.

* cited by examiner

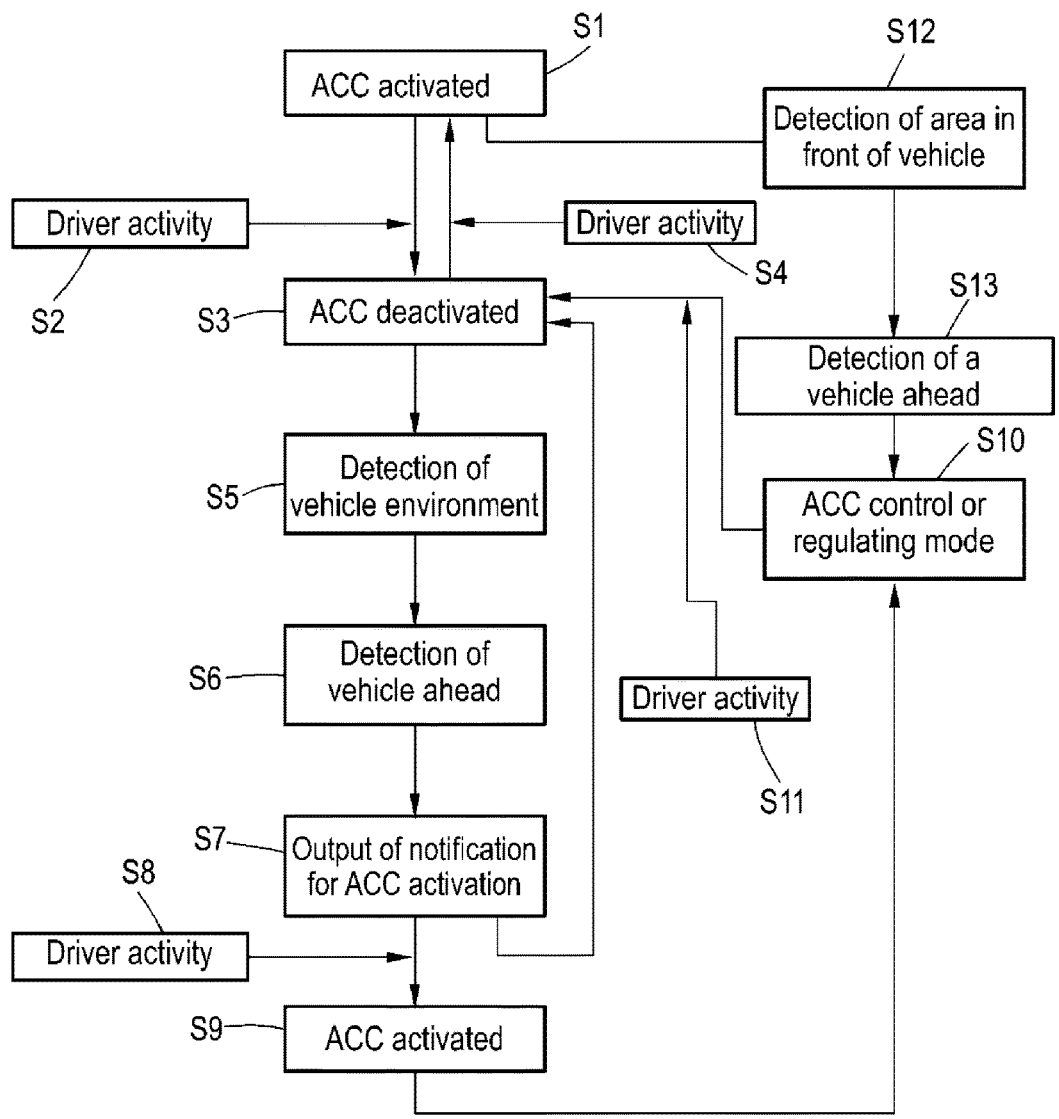

METHOD FOR OPERATING A MOTOR VEHICLE USING A LONGITUDINAL DRIVER ASSISTANCE SYSTEM

The invention relates to a method for operating a motor vehicle having a long-distance driver assistance system comprising at least one sensor which detects the area in front of the vehicle, and a control device which is designed to detect a vehicle traveling ahead as a function of sensor information and to output control or regulating commands to one or more of the vehicle components used for long-distance driving, when the driver assistance system is activated and operationally ready, in order to drive the motor vehicle relative to the vehicle traveling ahead of it, wherein the activated and operationally ready driver assistance system can be deactivated from a control or regulating mode via a driver activity and vice versa.

Modern motor vehicles increasingly have long-distance driver assistance systems which make it possible to automatically establish and maintain a distance from a preceding vehicle ahead without the driver's intervention. Such driver assistance systems are often also referred to as ACC (Adaptive Cruise Control) systems. Their function is based on sensor-supported detection of the area in front of the vehicle, wherein a control device can detect a possible vehicle ahead from the sensor information and, while considering distance and velocity information, can determine control or regulating parameters for associated vehicle components in order to drive its own vehicle in a defined manner with regard to speed and distance relative to the vehicle ahead. For a given velocity difference, the vehicle can be braked specifically for this purpose and adjusted to a defined minimum distance.

Essential for this is the sensor-supported detection and plausibility check of a vehicle ahead, which can form the basis of a control. Such a detection or, respectively, plausibility check is possible at the earliest starting at about 200 m distance between the vehicle itself and the vehicle ahead. An increased range, which would enable more predictive autonomous driving, is not possible due to the low range of the sensor(s) and the high uncertainty of the lane association of a detected vehicle ahead with respect to its own driving lane.

Due to the low range of the current sensors, a high differential velocity often cannot be compensated for without added braking intervention by the driver or strong braking. If the vehicle in question is significantly faster than the vehicle ahead, then the adjustment from a maximum distance of 200 m at the time of the plausibility check can only be made if the vehicle is heavily braked. This leads to uncomfortable braking. A forward-looking driver without such a driver assistance system would cut off the engine torque significantly earlier and thus use the engine braking phase markedly longer in order to already reduce part of the velocity difference with respect to the vehicle ahead, and would only decelerate the remaining differential velocity later. If a driver assistance system is present, for example an ACC system, then a driver looking ahead can also deactivate the system if he detects the situation, i.e. detects the approach to another vehicle ahead at a high differential velocity. This deactivation can be carried out by a driver's activity, for example the operation of a control lever of the system (e.g. cancel operation) or by light braking at a greater distance from the vehicle ahead, the driver assistance system having not yet detected the vehicle. The vehicle in question then automatically transitions to engine braking mode and decelerates early because the driver has deactivated the ACC system and has not actuated the accelerator pedal. The driver can now reactivate the driver assistance system, wherein different scenarios can arise depending on the activation time. If the driver activates the driver assistance system too early, meaning that the system has not yet detected the slower vehicle ahead, the vehicle in question will accelerate once more because the driver assistance system attempts to again reach the original velocity. If the driver activates the driver assistance system too late, meaning that the operationally ready driver assistance system that monitors the area in front of the vehicle as before has long since recognized the vehicle ahead, valuable time was spent in which the driver assistance system would have been able to react autonomously to the vehicle, such that significantly more velocity must be reduced by the driver assistance system via stronger braking.

The invention is therefore based on the problem of specifying a method which is improved in comparison with this.

In order to solve this problem, in a method of the type mentioned at the outset it is provided according to the invention that, if no vehicle ahead is detected by the activated driver assistance system and the driver assistance system is deactivated by a driver activity, detection of an area in front of a vehicle takes place continuously and, when a vehicle traveling ahead is detected, either a notification is output to the driver to reactivate the driver assistance system via a further driver activity and to place it into the control or regulating mode, or the driver assistance system activates itself autonomously and switches over to the control or regulating mode.

The method according to the invention provides for a possibility to resume the control or regulating mode after a previous deactivation at a point in time which permits a comfortable control or regulating mode and thus comfortable long-distance driving of the motor vehicle in question. For this purpose it is provided that, after the previously activated driver assistance system which has up to that point in time detected no vehicle traveling ahead is deactivated by a driver's activity, it is therefore still ready for operation and is effectively in a standby mode. However, it continually detects the area in front of the vehicle via the sensor system so that a possible vehicle ahead can be detected by the control device. If such a vehicle is detected, an active control or regulating process is not possible since the driver assistance system is still deactivated. Nevertheless, however, a good point in time is provided to reactivate the long-distance driving again, and thus to activate the driver assistance system. According to the invention, this time can now be indicated to the driver either by means of a notification that it would be expedient to turn on the driver assistance system. This activation can preferably take place by means of an additional driver activity, for example by the driver operates a control lever of the driver assistance system or performing a voice input etc. If the driver receives the notification and performs the appropriate driver activity, the driver assistance system is reactivated immediately and immediately takes over the long-distance driving, since the vehicle ahead has already been detected and undergone a plausibility check. The subsequent control or regulating mode can be carried out comfortably since there is still a sufficiently large distance with respect to the vehicle ahead.

As an alternative to the notification, it is also conceivable that the driver assistance system activates autonomously and automatically switches over to the control or regulating mode, wherein this automatic self-activation is preferably indicated to the driver by means of a corresponding notification.

Overall, the method according to the invention makes it possible to reactivate a previously deactivated driver assistance system which has been deactivated, for example, by means of a brief actuation of the brake or by deactivation via a control lever or the like, at a point in time that enables comfortable long-distance driving. For the driver, this means the possibility that he can, on one hand, drive attentively and brake actively, for example well before the sensor detection limit, thus if he has detected a corresponding driving situation, in order to reduce the present high differential velocity through braking. The driver assistance system is also in fact deactivated in doing so. However, this is not disadvantageous insofar as that, according to the method, a timely and situationally appropriate reactivation is readily possible, either supported by a notification or autonomously.

The notification is expediently output or, respectively, the driver assistance system is expediently activated autonomously if a vehicle ahead is detected and at least a drag deceleration is required to reduce the velocity difference between the motor vehicle in question and the vehicle ahead. On one hand, an early reactivation is thus possible in order to avoid this occurring too late and a violent braking process being required; on the other hand, the situation is also handled in a situation-specific manner, namely in the form of the activation being only indicated or effected if the current driving operation is to be changed. If, for example, the driver actuates the accelerator pedal as before but a drag mode, i.e., an engine braking is required, the notification can be given or the self-activation can take place. If, however, the driver does not actuate the accelerator pedal, i.e. if a drag mode is already present, it is not absolutely necessary to give the notification or to perform the self-activation. This may only be done later if, in addition to the drag mode, an active braking torque would also be required. In this way, situation-based methods can be used.

However, a notification or a self-activation can also be omitted if an actuation of the accelerator pedal and thus an acceleration of the motor vehicle is detected immediately before the point in time of the possible issuing of the notification, or of the self-activation. An active acceleration by the driver can be seen as an indication that an automatic long-distance driving is not desired, for example because the driver is preparing to overtake. This means that ultimately the acceleration operation is included in the decision concerning the notification or self-activation.

As previously described, in the case of self-activation the driver is preferably issued a notification that the driver assistance system is again in control or regulating mode, so that the driver is always informed of the activation state of the driver assistance system.

Such a notification, regardless of whether it is used to prompt the driver to activate or whether self-activation is indicated, is preferably given in the form of a visual representation on a display, for example the large display installed in the area of the center console or in the area of the instrument cluster. This visual notification should be given in such a way that, on one hand, it is very conspicuous and detected by the driver and is clearly different from the corresponding symbol that indicates the basic operational readiness of the driver assistance system. For example, the visual representation can also be blinking or distinctly brighter than the other representation etc.

Alternatively or additionally, it is also conceivable to give an acoustic notification by means of an entertainment system installed in the vehicle. Drivers can also very easily and quickly perceive such a notification.

A visual representation is, for example, an image display relating to the actuation of a control lever by means of which the switchover to the control or regulating mode takes place. Alternatively, of course, a text display or the like can also take place as long as the respective display is sufficiently conspicuous and intuitive.

In addition to the method itself, the invention further relates to a motor vehicle using a long-distance driver assistance system comprising at least one sensor which detects the area in front of the vehicle, and a control device which is designed to detect a vehicle ahead as a function of the sensor information and to output control or regulating commands to one or more of the vehicle components used for the long-distance driving process when the driver assistance system is activated and operationally ready, in order to drive the motor vehicle relative to the vehicle ahead, wherein the activated and operationally ready driver assistance system can be deactivated from a control or regulating mode by a driver activity and vice versa. The motor vehicle according to the invention is designed to implement the method as described above.

Additional advantages and individual details of the invention result from the exemplary embodiment described in the following as well as the corresponding drawings. The following is shown:

FIG. 1 is a schematic representation of a motor vehicle according to the invention suitable for carrying out the method according to the invention; and FIG. 2 is a flow chart showing the essential process steps;

FIG. 1 shows a motor vehicle 1 according to the invention comprising a long-distance driver assistance system 2 with at least one, normally a plurality, of sensors 3 which detect the area in front of the vehicle, by means of which information can be determined relating to or from the area in front of the vehicle. This information is provided to a control device 4 which is designed, in the case of operationally ready and activated driver assistance systems, for detecting a vehicle ahead as a function of the sensor information and for outputting control or regulating commands to one or more vehicle components serving for the long-distance driving. On one hand the engine 5, on the other hand the wheel brakes 6 are represented here as such vehicle components, so that the long-distance acceleration or deceleration can be controlled in an actively controlled manner via the control device 4. This control takes place as a function of the information regarding the vehicle ahead so that the vehicle can be approached in a controlled manner and the velocity can be controlled accordingly in order to regulate a certain distance etc.

The driver assistance system 2 can be placed from the activated state into a deactivated state by a driver's activity, for example stepping on the vehicle brake. In this deactivated state it is still ready for operation, meaning that the sensors 3 are still detecting information of the area in front of the vehicle and passing it to the control device 4. It is merely not in the control or regulating mode, meaning that none of the components described for the long-distance driving are activated, independently of the information detected regarding the area to the front of the vehicle.

If, in the case of a deactivated driver assistance system 2, a vehicle ahead is detected via the sensors 3 or, respectively, the control device 4 and said vehicle can be used as a regulating or reference vehicle with regard to which the long-distance driving is to take place, in a motor vehicle according to the invention a notification that the driver should reactivate the driver assistance system should thus be output via the control device 4 to the driver at a display device 7 and/or via a speaker system 8. This visual notification which is output via the display device 7 can, for example, take place in the form of a correspondingly conspicuous image display, for example, blinking etc. A corresponding voice request is executed via the speaker system 8.

The driver then has the discretion to follow the notification, but the driver can also disregard this. If the driver follows the notification, he activates the driver assistance system 2 by means of a corresponding driver activity, which thereupon immediately takes over the long-distance driving, thus activates the corresponding components 5, 6. If no driver activity is performed, thus the driver does not follow the notification, the driver assistance system remains in the ready-to-operate but deactivated state, wherein the monitoring of the area in front of the vehicle continues as before in order to output a new notification in the event of a changing situation, for example if a different vehicle is detected as a potential reference vehicle shortly thereafter.

FIG. 2 shows the essential sequence steps of the method according to the invention in the form of a flow chart.

It is assumed that the driver assistance system is what is known as an ACC system. In step S1, the ACC system is activated. However, during this time no vehicle traveling ahead was detected based on which the control or regulating mode could be switched off. The ACC system is deactivated, as shown in step S3, via a driver activity shown in step S2, for example a brief actuation of the brake. However, as previously described, the sensors 3 are still active. From this situation, i.e. with the ACC system deactivated, it would be fundamentally conceivable for the driver to reactivate the ACC system, as shown by the driver activity shown in step S4, even if no reference vehicle is detected during monitoring of the area in front of the vehicle. In this case, for example, this driver activity can be the actuation of a corresponding control lever of the ACC system. As a result, the ACC system is reactivated; see the corresponding arrow from step S3 to step S1.

If the deactivated ACC system remains in step S3, detection of the area in front of the vehicle continues as before according to step S5. If, as shown in step S6, a vehicle ahead is now detected that can be used as a reference vehicle for the control or regulating mode, in step S7 a notification is immediately output to the driver to activate the ACC system. As mentioned, this notification can be given visually via a display device, for example a corresponding middle console display or the instrument cluster, or alternatively also via the audio system, or both notifications can be given.

If the driver wants to follow the notification and now activate the ACC system, a driver activity is required according to step S8. For example, for this the driver must actuate the ACC control lever, for example pull it briefly or the like. However, activation by means of speech input etc. would also be possible. In step S9, the ACC system is then activated; it then switches immediately to the ACC control or regulating mode according to step S10, thus taking over the long-distance driving of the vehicle.

From this active mode, the ACC system can also be deactivated again, which takes place in that the driver again performs a driver activity; see step S11. For example, the driver again briefly actuates the brake or the like. The diagram clearly returns to step S3; the ACC system is deactivated. As previously described, from this situation, reactivation can take place according to step S4 through the driver activity; if not, detection of the area in front of the vehicle proceeds continuously as before according to step S5 and the described subsequent steps.

When the ACC system is activated in accordance with step S1, detection of the area in front of the vehicle naturally also proceeds, as shown in step S12. If, as shown in step S13, a vehicle ahead is detected as a reference basis, the ACC system immediately takes on the control or regulating mode according to step S10.

The detection of the area in front of the vehicle, which is also continuous in the deactivated state, thus ensures that the earliest possible detection of a vehicle ahead which can be used as a reference basis occurs, namely when the vehicle ahead is within the detection range of the sensors 3. The driver is notified promptly, i.e. at the earliest possible time, of the possibility to reactivate the ACC system since the system has detected a reference basis and can take over the automatic long-distance driving operation.

Alternatively, there is the possibility for the deactivated ACC system to also autonomously reactivate itself. In this case, according to step S6, upon detection of a vehicle traveling ahead the ACC system would automatically activate autonomously, meaning that the diagram according to FIG. 2 would then jump directly from step S6 to step S9, whereupon the ACC control or regulating mode proceeds according to step S10. In this case, no notification is output.

The invention claimed is:

1. A method, comprising:
    operating a motor vehicle, wherein the motor vehicle includes:
        a vehicle brake,
        an accelerator pedal,
        a long-distance driver assistance system comprising at least one sensor which detects an area in front of the motor vehicle, wherein the at least one sensor has a distance detection limit, and
        a control device which is designed to detect another motor vehicle traveling ahead as a function of sensor information and to output control or regulating commands to one or more vehicle components used for long-distance driving when the driver assistance system is activated and operationally ready, in order to drive the motor vehicle relative to the other motor vehicle traveling ahead, wherein the activated and operationally ready driver assistance system can be deactivated from a control or regulating mode by a driver activity and vice versa;
    upon deactivation of the driver assistance system by driver actuation of the vehicle brake, with no motor vehicle ahead detected within the distance detection limit of the at least one sensor,
    entering into a system standby mode, wherein none of the vehicle components used for long-distance driving are activated, independent of the at least one sensor detecting the area in front of the motor vehicle, and passing sensor information to the control device;
    continuously detecting the area in front of the motor vehicle; and
    reactivating the system autonomously, switching to a control or regulating mode, once another motor vehicle traveling ahead is detected and at least a drag deceleration is required to reduce a velocity difference between the operated motor vehicle and the other motor vehicle traveling ahead.

2. The method according to claim 1,
    wherein
    a self-activation is omitted if an actuation of the accelerator pedal, and thus an acceleration of the motor vehicle, is detected immediately before the time of the self-activation.

3. The method according to claim 1,
wherein
a notification that the driver assistance system is again in the control or regulating mode is output to a driver, along with the self-activation.

4. The method according to claim 3,
wherein
a visual representation on a display and/or an acoustic notification is output as the notification.

5. The method according to claim 4,
wherein
an image display relating to an actuation of a control lever by means of which the switching to the control or regulating mode takes place, is given as the visual representation.

6. A motor vehicle, comprising:
a vehicle brake;
an accelerator pedal;
a long-distance driver assistance system comprising at least one sensor which detects an area in front of the motor vehicle, wherein the at least one sensor has a distance detection limit and
a control device which is designed to detect another motor vehicle traveling ahead as a function of sensor information and to output control or regulating commands to one or more vehicle components used for long-distance driving when the driver assistance system is activated and operationally ready, in order to drive the motor vehicle relative to the other motor vehicle ahead,
wherein,
the activated and operationally ready driver assistance system can be deactivated from a control or regulating mode by driver actuation of the vehicle brake,
wherein upon said deactivation, with no motor vehicle ahead detected within the distance detection limit of the at least one sensor,
the driver assistance system may enter into a system standby mode, wherein none of the vehicle components used for long-distance driving are activated, independent of the at least one sensor detecting the area in front of the motor vehicle, and passing sensor information to the control device,
wherein the at least one sensor continuously detects the area in front of the motor vehicle, and is able to reactivate the driver assistance system autonomously, and switch to a control or regulating mode, once another motor vehicle traveling ahead is detected and at least a drag deceleration is required to reduce a velocity difference between the motor vehicle and the other motor vehicle traveling ahead.

* * * * *